March 26, 1968  O. G. STEGERUD  3,374,804
CHECK VALVES
Filed July 7, 1965

INVENTOR:
Olof Gustaf Stegerud,

BY
HIS ATTORNEY.

United States Patent Office 3,374,804
Patented Mar. 26, 1968

3,374,804
CHECK VALVES
Olof G. Stegerud, Timra, Sweden, assignor to Axel Larsson
Maskinaffar AB, Bromma, Sweden
Filed July 7, 1965, Ser. No. 470,066
3 Claims. (Cl. 137—512.1)

ABSTRACT OF THE DISCLOSURE

A check valve that is particularly well suited for pipe systems conveying fibrous material by the two semi-circular flanges of the check valve being provided with diametrical knife edges that engage each other upon closure of the valve so as to cut off neatly any fibers that may fasten between the knife edges.

This invention relates to check valves for use in connection with fluid-conveying pipe systems, etc.

In the chemical industry and the cellulose industry reliable check valves of high grade material, such as stainless steel and acid proof steel or acid proof bronze have considerable importance. Unfortunately, these materials are very expensive.

Known check valves for the above-mentioned use generally comprise a housing in the shape of a comparatively long flanged piece of pipe containing a hinged flap that increases the circumferential dimensions of the housing relative to the diameter of the remainder of the pipe to a substantial extent. For this reason these check valves are heavy and very expensive in proportion to the weight of the material contained in them, and in addition to this they consume a great deal of space.

The instant invention has for its object to provide a check which is reliable in use with pipes conveying fibrous material, for instance in the paper industry, which furthermore is of very simple design and of light weight and which may be incorporated into existing pipe systems in a very simple manner. For this purpose the check valve in accordance with the invention is characterized by a ring which is adapted to be clamped between two pipe flanges and which at its inner circumference exibits a thin flange directed radially inwards and is provided with a diametrical axis around which two valve flaps of semi-circular shape are freely pivotable in hinge-like manner so that their outer edges may tightly engage one side of the inwardly directed flange, with the substantially radial edges of the valve flaps that are adapted to engage each other being of knife-edgelike shape, at least in the region of the sealing surface.

The valve flaps may preferably be provided with counterbored seat surfaces at their arc-shaped circumferential edges with their inner edges ending sharply.

Figure 1:
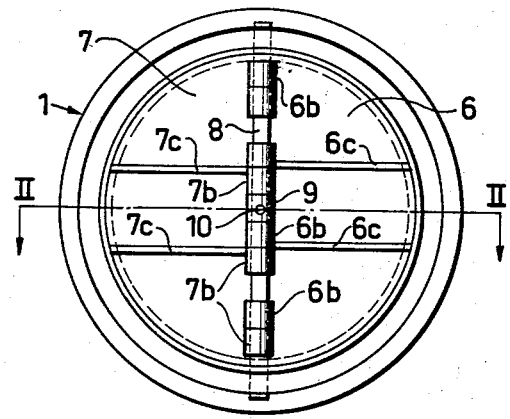
Figure 2:
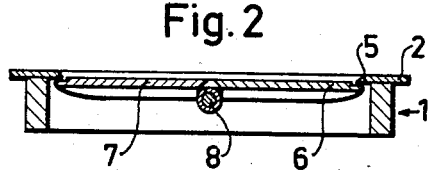
Figure 4:
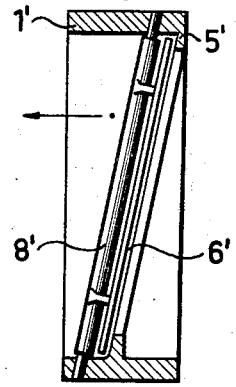
Figure 3:
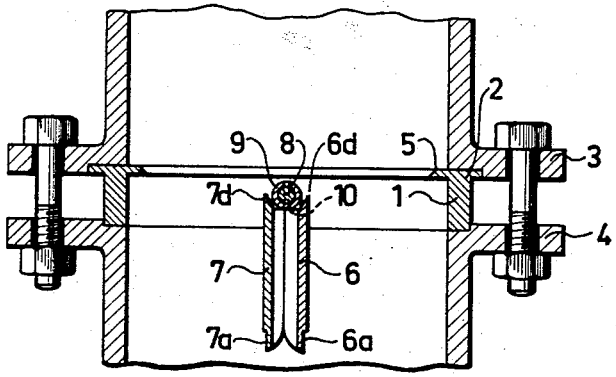

An embodiment of the invention will now be described with reference to the accompanying drawing, in which FIGURE 1 shows a front view of a check valve in accordance with the invention, FIGURE 2 shows a cross section taken along the line II—II in FIGURE 1, FIGURE 3 shows a cross section of a valve in open position and mounted in a pipe, and FIGURE 4 shows a side elevation of a modified embodiment.

In the drawing 1 designates a ring that may be provided with a flange 2 directed radially outwards for its positioning between two pipe flanges 3 and 4, respectively (FIGURE 3). At the inner edge of its circumference said ring 1 is provided with a flange 5 which is directed radially inwards. One side of flange 5 forms a seating surface for the circumferential edge of two semi-circular valve flaps 6 and 7, which at their opposing radial edges are freely pivotable in hinge-like manner around a shaft 8 extending along a diameter of ring 1 and being fastened to the inside of said ring at its ends.

The shaft 8 is positioned in such manner that the flat, semi-circular valve flaps 6 and 7 may engage the side of flange 5 facing said flaps.

The respective valve flaps 6 and 7 may preferably be provided with seating surfaces 6a and 7a, according to FIGURE 3, which have been turned in a lathe and thus are counterbored at their arc-shaped circumferential edges. Collars 6b and 7b that engage each other and are axially fixed by a sheath 9 with a screw 10 serve as mounts for the respective valve flaps 6 and 7.

Appropriate reinforcing springs 6c and 7c are positioned on the back sides of the valve flaps counting in the direction of flow.

Particularly in lines for fibrous material the respective radial edges 6d and 7d of the valve flaps opposing each other are at least in the region of the seating surface formed similar to knife edges in order to cut off possible fibers, which otherwise would be squeezed between these edges and would prevent effective and complete sealing.

The flanges 5 and 2, which are directed inwards and outwards, respectively, are preferably composed of one single annular strip which as illustrated in FIGURE 2 is welded to the body of ring 1. In this manner a simple and inexpensive structure of great reliability and accuracy is attained.

As is illustrated in the drawing, the inner edge of flange 5 may be of conial shape on the side turned away from the seating surface in order to decrease the contraction of the fluid flowing through and to prevent fibres from gathering in the fiber suspension lines.

FIGURE 4 shows an axial section of a modified embodiment, where the shaft 8' mounted in the axial plane of ring 1' forms an angle to the end plane of ring 1'. The seating surface of flange 5' is situated in a diametrical plane parallel to shaft 8'. Said flange may consist of sheet metal of even thickness or it may be formed integrally with the material of the ring. By means of this arrangement the valve flaps may be made more sensitive to the backward flow when mounted in horizontal lines with the valve being positioned with its seating surface directed obliquely upwards. Hereby the weight of flaps 6' and 7' will be made effective in the direction of closure.

The check valve of the invention has proved to be particularly reliable in fiber suspension lines of this type, and tests have shown that fibrous suspensions and suspensions of other silted solid material will not be deposited in the region of the sealing surface or within the range of motion of valve flaps 6 and 7. From the above it will be quite obvious that this invention has provided a check valve structure which requires a minimum of space, and this in turn enables the valve to be introduced into existing pipe systems straight off. Moreover, the check valve of the invention has extremely low weight and a correspondingly low cost of fabrication with respect to the high grade material from which this type of valve must be made. Also, the check valve exhibits a high degree of reliability even for fibrous suspensions as a result of its advantageous design from a current-flow point of view as it lacks pockets or other parts that may collect the solid components of the suspensions.

What I claim is:
1. A check valve, preferably for pipe system for conveying fibrous material, comprising a ring adapted to be clamped between two pipe flanges and exibiting at its inner circumference a flange directed radially inwards, a shaft mounted in an axial plane of said ring, and two semi-circular valve flaps, wherein said valve flaps are freely pivotable in hinge-like manner around said shaft so as to engage one side of said flange with their arc-shaped outer edges and the substantially diametrical edges of said valve flaps that are adapted to engage each other in incisior manner and are of knife edge-like shape at least in the region of hte sealing surface.

2. A check valve in accordance with claim 1, characterized in that said valve flaps are provided with a counterbore seating surface at their arc-shaped circumferential edges.

3. A check valve in accordance with claim 1, characterized in that the seating surface of said inwardly directed flange is positioned in a diametrical plane in slanting relationship to the end plane of said ring and that the shaft mounted in the axial plane of said ring is in a slanting position, parallel to said seating surface.

References Cited

UNITED STATES PATENTS

| | | | |
|---|---|---|---|
| 109,906 | 12/1870 | Hutson | 137—242 |
| 1,238,878 | 9/1917 | Bravo | 137—527 X |
| 1,802,564 | 4/1931 | Lacey | 251—212 |
| 1,899,154 | 2/1933 | Karrick | 137—242 |
| 1,980,495 | 11/1934 | Muir | 251—298 |
| 3,007,488 | 11/1961 | Wheeler | 137—515.7 |

FOREIGN PATENTS 15,264   6/1910   Great Britain.

WILLIAM F. O'DEA, *Primary Examiner.*

W. WRIGHT, *Assistant Examiner.*